United States Patent
Slankard et al.

[11] Patent Number: 5,829,844
[45] Date of Patent: Nov. 3, 1998

[54] WHEEL HUB ASSEMBLY AND METHOD OF MANUFACTURING THE SAME

[75] Inventors: Billy D. Slankard, Clay City; Jimmie L. Haley, Olney, both of Ill.

[73] Assignee: Union Gesellschaft fur Metallndustrie mbH, Olney, Ill.

[21] Appl. No.: 538,733

[22] Filed: Oct. 3, 1995

[51] Int. Cl.⁶ .................................................. B60B 27/06
[52] U.S. Cl. .................................... 301/110.5; 301/64.7
[58] Field of Search ............................ 301/110.5, 59, 301/64.7, 105.1

[56] References Cited

U.S. PATENT DOCUMENTS

| | | |
|---|---|---|
| 208,275 | of/1878 | Unknown . |
| 353,071 | 11/1886 | King . |
| 431,529 | 7/1890 | Redinger . |
| 473,837 | 4/1892 | Green . |
| 506,858 | 10/1893 | Perkins . |
| 554,464 | 2/1896 | Tomlinson . |
| 583,190 | 5/1897 | Parish . |
| 592,599 | 10/1897 | Warwick . |
| 608,099 | 7/1898 | Bentley et al. . |
| 622,635 | 4/1899 | Reed . |
| 623,409 | 4/1899 | Ludlow . |
| 636,890 | 11/1899 | Birkette . |
| 644,139 | 2/1900 | Laass . |
| 811,112 | 1/1906 | Wheeler et al. . |
| 1,383,486 | 7/1921 | Roberts . |
| 1,443,954 | 2/1923 | Ibach . |
| 2,181,665 | 11/1939 | Messamore . |
| 3,082,042 | 3/1963 | Liebreich ................. 301/110.5 |
| 4,595,242 | 6/1986 | Wehmeyer ............... 301/110.5 |
| 4,622,731 | 11/1986 | Kjell . |
| 5,104,201 | 4/1992 | Ross ........................ 301/110.5 |
| 5,301,778 | 4/1994 | Haeussinger . |

FOREIGN PATENT DOCUMENTS

| | | |
|---|---|---|
| 48335 | 1/1934 | Denmark . |
| 82058 | 5/1956 | Denmark . |
| 648036 | 12/1928 | France ................. 301/110.5 |
| 887014 | 7/1943 | France . |
| 921983 | 3/1947 | France . |
| 930556 | 6/1948 | France . |
| 83628 | 12/1903 | Germany . |
| 3406650 | 9/1985 | Germany .............. 301/110.5 |
| 278801 | 2/1934 | Italy . |
| 416295 | 1/1946 | Italy . |
| 424141 | 6/1947 | Italy . |
| 17142 | of 1909 | United Kingdom ..... 301/110.5 |
| 546563 | 7/1942 | United Kingdom . |

*Primary Examiner*—Russell D. Stormer
*Attorney, Agent, or Firm*—Lyon & Lyon LLP

[57] ABSTRACT

A vehicle hub assembly and method of manufacturing the assembly which eliminates ball and needle bearings and many other parts, thereby simplifying manufacturing and increasing durability. The assembly comprises a molded hub having a central opening for receiving an axle therethrough on which the hub rotates. Like flanges are provided on each end of the hub and the flanges have openings for receiving spokes. In one embodiment, molded bushings are provided in each end of the hub and include abutment portions for bearing against the flanges. The center of the flanges and the ends of the hub are configured in each embodiment so as to allow the flanges and hub ends to readily mate together and align in a predetermined angular offset with respect to one another. This arrangement ensures that like flanges can be used on each end of the hub but be angularly offset in a simple and predetermined manner.

13 Claims, 4 Drawing Sheets

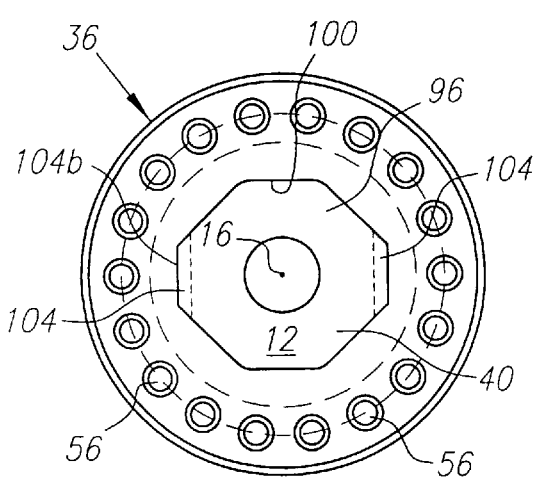
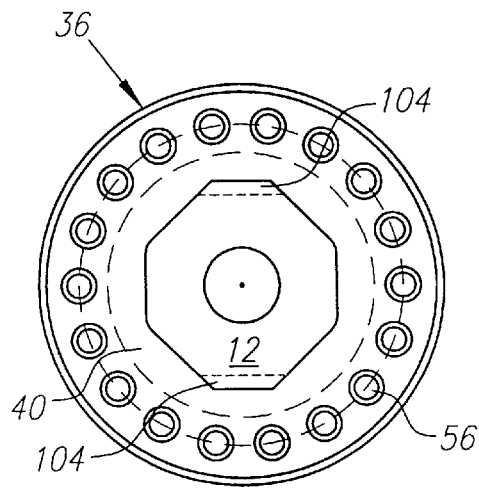
FIG. 6a      FIG. 6b
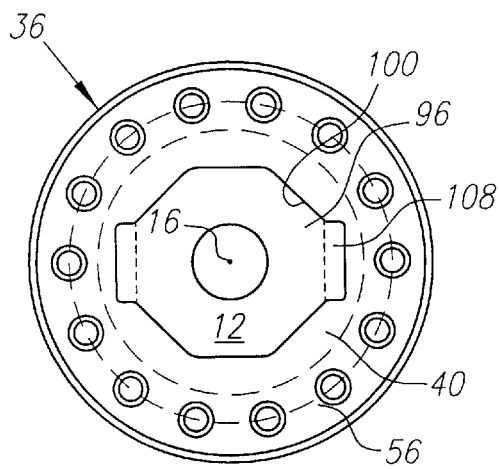
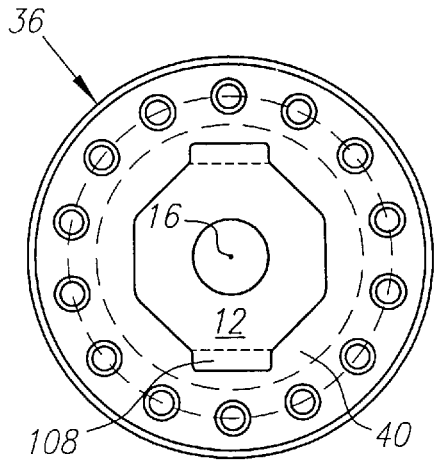
FIG. 7a      FIG. 7b
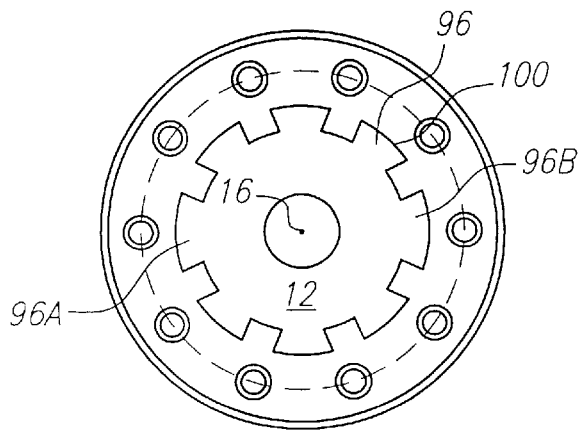
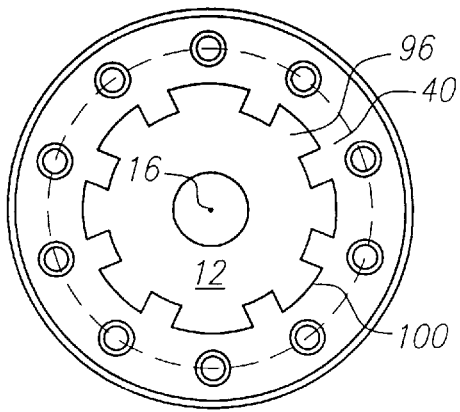
FIG. 8a      FIG. 8b

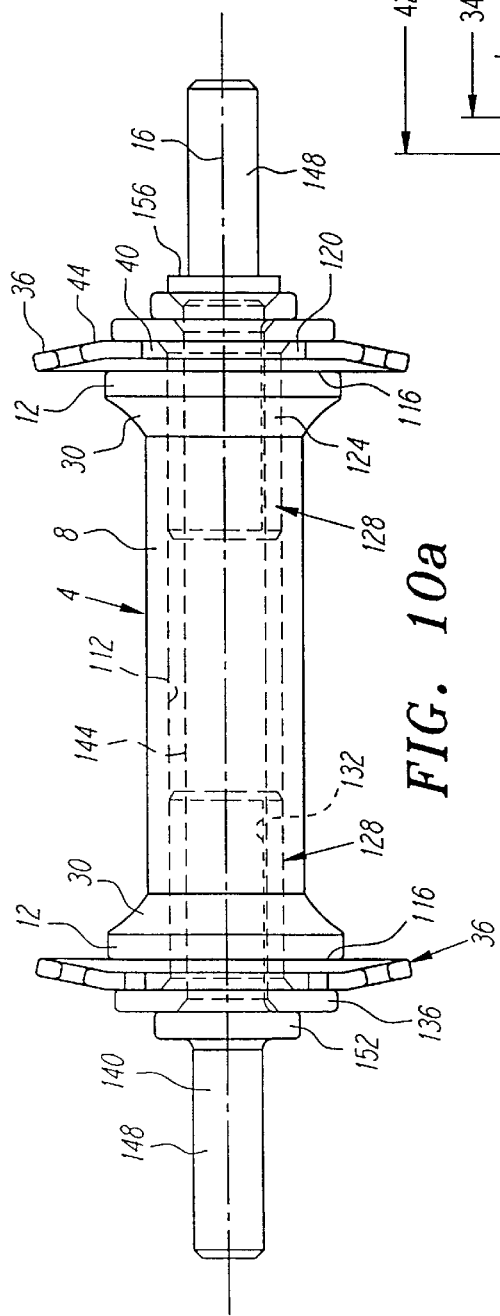
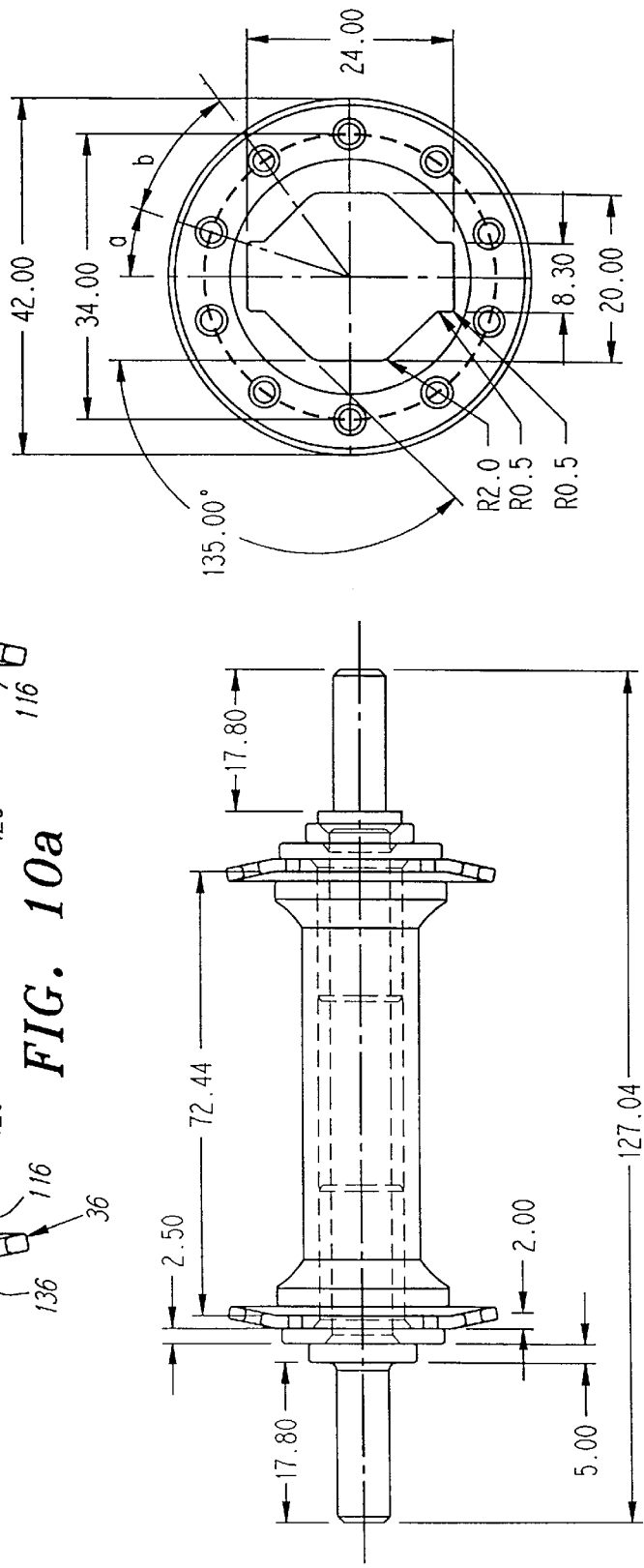
FIG. 10a
FIG. 10b
FIG. 10c

WHEEL HUB ASSEMBLY AND METHOD OF MANUFACTURING THE SAME

BACKGROUND OF THE INVENTION

1. Field of the Invention

This invention relates to wheel hub assemblies and methods of manufacturing wheel hub assemblies. Although the invention is particularly useful for bicycles, it can be used for other vehicles such as motor powered vehicles or unpowered vehicles such as wheelchairs, including wheelchairs used in athletic contests.

Because bicycles present a challenge to the innovator and manufacturer in terms of the goals of light weight, strength and aerodynamic design, the invention is disclosed primarily in that context, without any express or implied limitation on the scope of the invention.

As in any manufacturing operation, reduction of the number of parts to be manufactured and assembled, and of the number and complexity of steps to be performed leads to cost savings. With fewer parts, durability is increased and the possibilities of failure in use are also reduced. Such advantages are provided by this invention. It is also desirable to minimize errors in assembly of parts. This invention provides such advantages by suitable designs which reduce or eliminate (1) manufacturing defects such as spoke hold alignment between hub flanges, and (2) mistakes in assembly. Precise angular alignment of such holes can be readily provided with the present invention which simplifies wheel assembly.

2. Description of the Prior Art

Despite the more than century long existence of the bicycle as a mode of transportation, sport and competition, the technology continues to develop and improve. A typical present day bicycle wheel hub assembly includes some twenty-five parts, typically an axle, two retainer nuts, two bearing inner races, fourteen ball bearings, two ball bearing retainers, two flanges, and one center tube, plus lubrication for all of the moving parts. One such hub assembly is shown in U.S. Pat. No. 5,301,778, all of the pieces being of metal.

U.S. Pat. No. 4,622,731 discloses an injection molded plastic hub for a wheelchair which is produced in two parts which are then joined by glue or ultrasonic welding. This hub also uses ball bearings and associated mechanisms. As compared with U.S. Pat. No. 5,301,778, some parts are combined but others are split so that the overall complexity is about the same for the hubs shown in each of these patents.

U.S. Pat. No. 554,464 and British Patent 546,563 disclose metallic wheel hubs made of tubes with separate metallic end caps and both require ball bearings. Other examples of hubs and separate end caps as shown in U.S. Pat. Nos. 353,071 and 583,190, French No. 921983 and Italian No. 278801.

SUMMARY OF INVENTION

This invention provides a wheel hub assembly and a method of manufacturing the assembly which eliminates the need for a substantial number of parts, including ball bearings, bearing races and bearing retainers. The assembly is relatively inexpensive to manufacture and assemble and the construction is such that errors in assembly are unlikely. It also is lighter, stronger, more durable and more accommodating of appropriate aerodynamic design than known hub assemblies.

According to one embodiment, the assembly includes an injection molded hub along with flanges keyed and attached to the ends of the hubs. An inner shaft extends through the hub and no ball or roller or bearings are needed. The flanges can accommodate different numbers of spokes. A preferred embodiment has an injection molded hub and injection molded bushings, as well as flanges keyed and attached to the ends of the hubs. An inner shaft extends through the bushings and hub and no ball or roller bearings are needed.

BRIEF DESCRIPTION OF THE DRAWINGS

FIG. 6A and FIG. 6B are opposite end views of a hub assembly for a thirty-six spoke wheel, each similar to the view in FIG. 3 but showing a different shape for the central portions of the flanges and end sections of the hub body.

FIG. 7A and FIG. 7B are similar opposite end views of a hub assembly for a twenty-eight spoke wheel.

FIG. 8A and FIG. 8B are similar opposite end views of a hub assembly for a twenty spoke wheel.

FIG. 10a is a front elevational view of a preferred embodiment of the invention incorporating bushings within the ends of the hub; and FIG. 10b is a specific dimensioned view thereof and FIG. 10c is a specific dimensioned view of one of the flanges, the other flange being identical.

DETAILED DESCRIPTION OF THE INVENTION

Figure 2A:
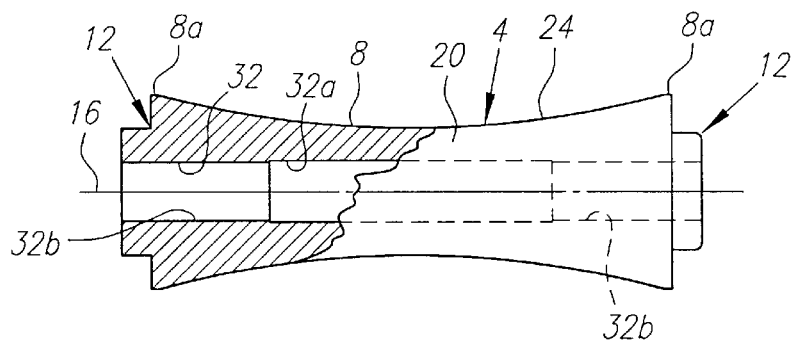
FIG. 2a is a transverse section of the hub body shown in FIG. 1 taken through axis 16 shown in FIG. 1.

As shown in the drawings, the hub assembly has a hub body 4 comprising a central section 8 and end sections 12 (see FIG. 2). As will be discussed subsequently, the hub body 4 is injection molded of plastic and includes a central shaft opening 32 for receiving an axle or shaft 80. The hub assembly also includes a flange 36 on each end 12 of the hub body, each of which is keyed or locked to the respective ends 12 as will be further described below.

The central shaft opening 32 is provided in central section 8 and end sections 12. The shaft opening is cylindrical and centered on axis 16. The diameter thereof is larger in section 32b than in outer sections 32b.

Figure 1:
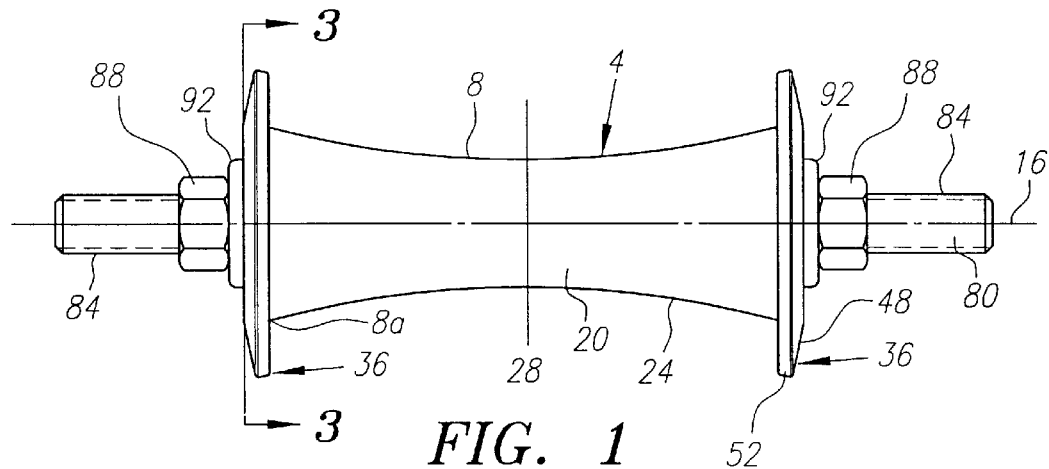
FIG. 1 is a front elevational view of a first embodiment of an assembly according to the present invention.
Figure 5:
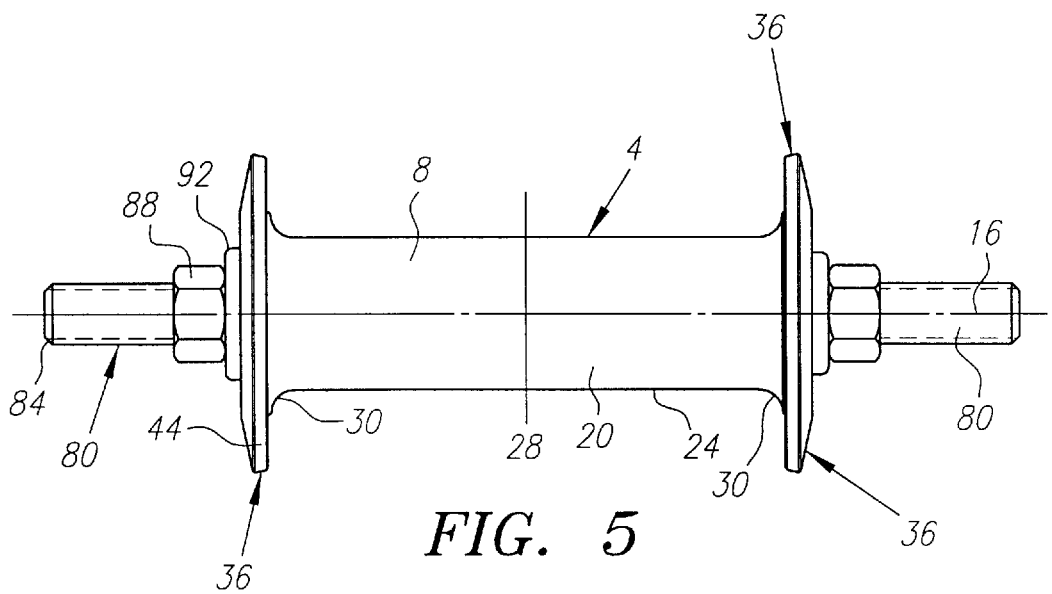
FIG. 5 is a front elevational view of a variation of the embodiment of the hub assembly.

The end sections 12 in FIGS. 1, 2 and 5 are stepped down as shown and are smaller in diameter than the diameter of the adjacent ends of central section 8. In all the embodiments herein the end sections 12 are configured in a manner to mate with and to provide a mechanical locking fit with flanges 36 in order to facilitate error free assembly of the flanges and a specific angular orientation of the flanges on the end sections 12. This arrangement allows both flanges to be identical, but still be aligned with their spoke holes offset from each other.

Figure 2B:
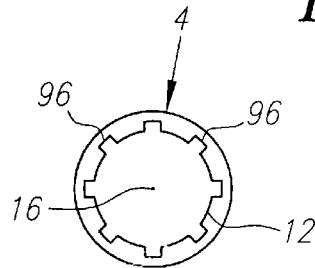
FIGS. 2b and 2c respectively are diagrammatic views of the end of the hub of FIG. 2a and side of a flange which mates with the hub ends.
Figure 2C:
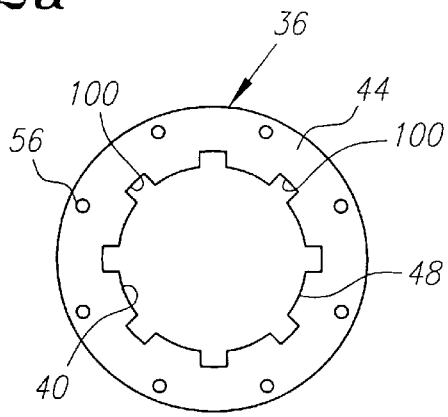

More specifically, the flanges 36 preferably are formed of metal and are provided on each end of the hub body 4, and in all of these embodiments each flange 36 is in the shape of an annulus 44 and comprises a central opening 40 which is configured to have a mechanical fit with the shape of the adjacent end section 12 of the hub body 4. One end is shown diagrammatically in FIGS. 2b and 2c, wherein FIG. 2b diagrammatically shows a hub end section 12 with radially extending protrusions 96 and FIG. 2c diagrammatically shows a flange 36 with mating recesses 100. The annulus or ring 44 surrounds the central opening 40 and the ring has a configured inner portion 48 which contacts and cooperates with the ends of central section 8 of hub body 4 and also mechanically fits the shape of end section 12 and locks around it.

The shape of each end section 12 is identical, but of significance one is angularly offset from the other. This allows the use of identical flanges on each end section 12 while still allowing the spoke holes on one to be offset from the holes of the other.

Turning again to the hub body 4, the axle 80 extends through the shaft opening 32 in the central section 8 and through end sections 12 of hub body 4 and the central openings 40 in flanges 36. The diameter of the axle between the flanges 36 at each end of the hub assembly is such as to provide a sliding fit with the hub body 4 with sufficient spacing therefrom to accommodate a lubricant coating between the axle and the hub body but not so great as to cause unstable rotation. An example spacing or "running clearance" is approximately two thousandths inch. Ends 84 of the axle are threaded for receiving suitable nuts and to be locked thereon in various conventional ways.

The retaining members may be typical hex head jamb center lock nuts 88 as shown, with washers 92 between the nuts and the flanges 36. Other types of retainers can be used, and in some applications washers to distribute axial thrust may not be necessary. As shown in FIG. 5, but not necessarily only useful in that embodiment, washers 92 are larger in outer diameter than those shown in FIG. 1, and they overlap ring 44 of flanges 36 to prevent flanges 36 from popping off each end section 12 during the wheel building process.

Figure 3:
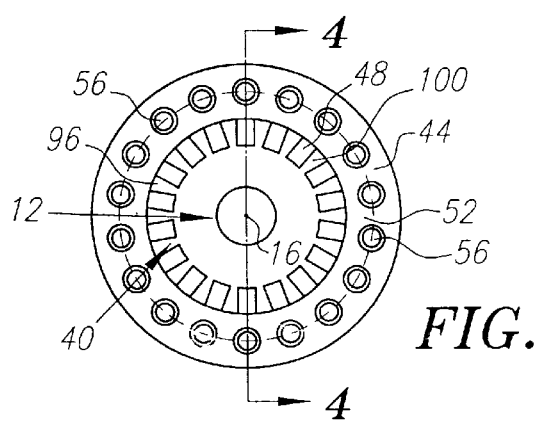
FIG. 3 is an end view of the hub assembly taken along a line 3—3 of FIG. 1 and omitting axle 80 and particularly showing a mating flange.

Turning now to a more detailed discussion of the flanges, they may have various internal configurations to mate with like configured end sections 12, and also can have different numbers of spoke holes. FIG. 3 shows a flange for one embodiment of the hub assembly for a bicycle wheel with thirty-six wheel spokes. Each flange 36 receives the ends of eighteen spokes in eighteen spoke holes 56 spaced at twenty degree intervals of rotation about axis 16. In this embodiment, the end sections 12 of hub body 4 include eighteen radially extending protrusions or teeth 96 which fit into recesses 100 in the inner portion 48 of ring 44 of flange 36. This provides a secure locking action between each end section 12 and flange 36, and ensures a fixed orientation between the section 12 and flange 36. The recesses 100 are offset from the spoke holes 56 to provide greater strength in the flange 36.

As will be apparent from the foregoing, providing a locking fit of the flanges to the sections 12 aids in reducing the number of parts required to make up a hub assembly while enabling precise alignment (particularly an offset) of the spoke holes of the two flanges. The two flanges then can be identical, and still fit on the sections with the spoke holes preferably offset. The assembly of the hub is therefore substantially simplified.

Although not specifically shown in FIG. 3, but shown in the embodiments of FIGS. 6A–8B, the recesses, protrusions, spoke holes, and spokes on one side of the assembly are angularly offset from those on the opposite side of the assembly so that the threaded ends of the spokes at the wheel rim will also be offset from one another to provide both resilience and strength in the assembled wheel. In the embodiment of FIG. 3, the offset is by ten degrees of rotation.

FIGS. 6A and 6B show both flanges of a hub assembly and both end sections in another embodiment for a wheel with thirty-six spokes so as to better illustrate example configurations and, in particular, the offset of the configurations of each sections 12 and flanges 36. In this version, each flange 36 has eighteen spoke holes 56 spaced at twenty degree intervals. However, in this embodiment, the end sections 12 of the hub body 4 and the mating central openings 40 in the flanges 36 are both generally hexagonal rather than having the eighteen recesses and protrusions of the FIG. 3 embodiment. In this embodiment two diametrically opposite sides of the hexagonal end sections and central openings extend outwardly from the axle beyond the hexagonal cross-section thereby forming two trapezoidal extensions 104 which are aligned with spoke holes along the same radius. The larger bases 104a of the trapezoids are sides of the hexagon and the smaller outer bases 104b are parallel thereto.

FIGS. 6A and 6B thus together show how, as described above in connection with FIG. 3, the recesses 100, protrusions 96 and spoke holes 56 of the opposite flanges are angularly offset or misaligned from one another by, in this example)ten degrees of rotation. However here the central openings 40 in the opposite flanges and opposite end sections 12 in the hub body are offset from one another by ninety degrees of rotation about axis 16.

FIGS. 7A and 7B show still another embodiment for a wheel with twenty-eight spokes. Each flange 36 has fourteen spoke holes 56 at intervals of 360°+14 or 25.714°. The spoke holes on opposite flanges are offset from one another by 360°+28 or 12.857°. As shown in this embodiment, end sections 12 of hub body 4 and mating central openings 40 in flanges 36 are also generally hexagonal as in FIGS. 6A and 6B. However in FIGS. 7A and 7B, extensions 108 on diametrically opposite sides of each hexagon are rectangular, with the long sides of each extension being, respectively, coincident with and parallel to sides of the hexagon and are aligned with spoke holes on the same radius. Similarly to the embodiment shown in FIGS. 6A and 6B, the central openings in opposite flanges 36 and opposite end sections 12 in the hub body in FIG. 7A and 7B are angularly offset from one another by ninety degrees of rotation.

FIGS. 8A and 8B show yet another embodiment for a wheel with twenty spokes. Each flange 36 has ten spoke holes spaced at thirty-six degree intervals. As shown in these FIGS., the central openings 40 in flanges 36 and the mating end sections 12 of hub body 4 are similar in shape, but different in number of protrusions 96 and recesses 100 to those shown in FIG. 3. Each recess and protrusion has sides along radii of the assembly. Both the outer edges of each protrusion and the mating inner edge of each recess lie along a circle around axis 16. Similarly the more centrally located surfaces of the end sections 12 and ring 44 lie along a more centrally located circle around axis 16.

In FIGS. 8A and 8B, two diametrically opposite protrusions 96A and 96B and the corresponding recesses have slightly larger dimensions along these circles than the other similar structures and are aligned with spoke holes on the same diameter. As in FIGS. 6A and 6B and FIGS. 7A and 7B, the central openings in opposite flanges and opposite end sections 12 in the hub body are angularly offset from one another by ninety degrees of rotation.

Features common to all of the embodiments include an even number of spokes and an even number of spoke holes, with half the number of spokes for each flange, for balanced distribution of forces in operation of the wheel. The invention is not limited to any particular number of spokes and spoke holes. Twenty, twenty-eight, thirty-two, and thirty-six are the most common. The rotational offset of spoke holes is a function of the number of spokes. The degrees of offset or misalignment of the recesses and protrusions in the flanges will vary depending on the shape of the central openings in the flanges 36 or the number of teeth or protrusions, but in all cases, relatively precise offset is important for wheel balance.

All of the embodiments provide a hub assembly with an axle rotatable in a central hub body opening without any need for bearings, bearing races or bearing retainers. All of the embodiments provide a hub assembly which is easy to assemble with less chance of error by relatively unskilled workers and which is less susceptible to failure under stress.

The features shown in the embodiments shown in FIGS. 6A–8B have in common the axially non-symmetrical structure of end portions 12 and central openings 40 and the ninety degree offset of opposite corresponding structures which provide additional strength to the assembly. Extensions 104 in FIGS. 6A and 6B, extensions 108 in FIGS. 7A and 7B and protrusions 96A and 96B in FIGS. 8A and 8B perform similar functions.

Applicants prefer the configuration embodiment of the end portions shown in FIGS. 7A and 7B (and shown in further detail in FIG. 10c).

The invention is not confined to the exact configurations shown in the drawings. For example, the modified hexagon shape shown in FIGS. 6A and 6B could be used in an assembly with twenty spokes as shown in FIGS. 8A and 8B. A person skilled in the art with knowledge of applicants' invention will readily find numerous variations within the scope of the claims.

Figure 4:
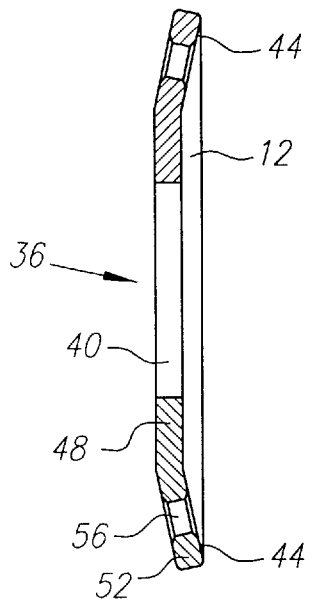
FIG. 4 is a sectional view of a flange 36 shown in FIGS. 1 and 3 taken along line 4—4 of FIG. 3.
Figure 9:
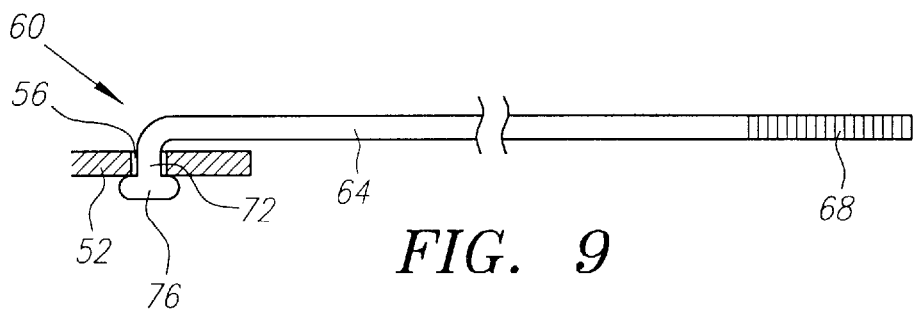
FIG. 9 shows a spoke 72 mounted in a spoke hole 56 such as is shown in FIG. 3 and FIGS. 6A through 8B.

As best shown in FIG. 4, the ring 44 also has an outer portion 52 which is inclined slightly inwardly toward axis 16 and central plane 28 essentially parallel to the spokes (not shown) to thereby reduce stress on the spoke holes as is known. The outer portion 52 of ring 44 is also provided with a plurality of spoke holes 56 in which spokes are mounted. Flanges with different numbers of holes can be provided. FIG. 9 shows a typical spoke 60. It includes a long shaft 64 with a threaded end 68 for attachment to a wheel rim (not shown). Opposite the threaded end is a bent portion 72 which terminates in a flattened portion 76. As is known to those skilled in the art, in assembly of the wheel, the shaft 64 is inserted through spoke hole 56, and the flattened end 76 and bent portion 72 bear against outer portion 52 of ring 40 to secure the spoke in the hole 56.

A preferred hub embodiment is shown in FIG. 10. FIGS. 10b and 10c illustrate example dimensions (in mm) for the hub assembly (10b) and flanges (10c). It includes a hub body 4 with a central section 8 and end sections 12 similar to those of FIGS. 1 and 5. However, the central section 8 is a hollow cylinder with an axially extending cylindrical hollow core space 112 somewhat similar but not identical to the shaft opening 32 in the other embodiments, as will be described below. The outer surface of the central section, similar to the one shown in FIG. 5, terminates at each end in a smoothly curved portion 30 extending outwardly from the axis 16 to the ends of central section 8. End sections 12 each comprise flange abutment portions 116 and configured flange mating portions 120, both of which have core spaces 124 extending outward and continuous with core space 112. The mating portions 120 and flanges 36 may be similar to any of those shown in FIGS. 3 and 6A–6B, but a hexagonal based design as shown in FIGS. 7A and 7B and 10c is preferred. Abutment portions 116 have outer diameters larger than the largest diameter of central openings 40 in flanges 36 so as to abut ring 44 of each flange 36.

At each end of central section 8 there is provided a bushing 128. Bushings 128 each comprise a hollow sleeve 132 externally sized to be inserted within hollow core spaces 112 and 124 of the central section 8 and end sections 12. Bushings 128 are also each provided with abutment or flange portions 136 with central holes continuous with the internal walls of the hollow sleeves 132. The external diameter of portions 136 of bushings 128 are of similar diameter to abutment portions 116 of end sections 12 so as to engage the outer sides of ring 44 of each flange 36, and hold the flanges against the portions 116 of the hub body 4. Thus, each flange 36 interlocks with flange mating portion 120 of each end section 12 and is abutted on each side by abutting portions 116 and 136.

Axle 140 in this embodiment is formed with a central area 144 and two threaded end areas 148. The central area 144 has a diameter which permits it to rotate within the hollow sleeves 132 of bushings 128 without contact with the walls of hollow core space 112. An example running clearance is two thousandths inch. Axle 140 is provided with an integral enlarged portion 152 on one side thereof between central area 144 and one of the threaded end parts 148. Enlarged portion 152 abuts flange portion 136 of bushing 128 (see left side of FIG. 10). The opposite end of axle 140 is secured within hub body 4 by tightening a nut 156 down on threaded axle portion 148 to abut flange portion 136 of the bushing 128 (see right side of FIG. 10) at the opposite end of axle 140.

Thus in this embodiment, retaining members comprising lock nuts 88 and 92, as shown in FIGS. 1 and 5, are replaced by flanges 136 of bushings 128, of portion 152 of axle 140 and nut 156. The contact of axle 140 with central section 8 is eliminated, and assembly of the unit becomes even less susceptible to error as will be seen below.

Manufacturing of the wheel hub assembly in accordance with Applicants' invention involves the following broad steps which will be further described in detail below:
1. Making the hub body 4
2. Making the axle 80
3. Making the flanges 36
4. Providing the retaining members
5. Assembling the unit The hub body 4 is an injection molded one piece body of a plastic material which is resilient to accommodate sudden shocks caused by irregularities in the surface over which the vehicle is driven and strong enough to withstand the continuing stresses of rotation of the wheel to which it is attached by the spokes. A plastic material with a Teflon additive to provide a low coefficient of friction is important and provides good results. A preferred material is polytetrafluoroethylen (PTFE) sold under the name Acetal 80 and which has a low coefficient of friction. An additive to reduce the coefficient of friction such as UH5 can be blended into any suitable plastic material which is used. The shape of the hub body is shown herein and described above with particular reference to its shaft opening 32, its symmetry with respect to axis 16 and central diameter plane 28 and its end sections 12. The wall of shaft opening 32 as molded is larger in the middle 32a. It is a smooth cylinder at each end washers 32b slightly larger in diameter than the diameter of axle 80, and preferably the ends outer section 32b are formed as described later. The hub body can have any suitable shape consistent with strength, weight, looks and the like.

The axle 80 is made from low carbon hot or cold rolled steel wire which has been straightened and cut to length with the ends chamfered. Each end of the axle is roll threaded. The axle is cleaned and given a rust inhibiting treatment by any of several conventional methods.

The flanges 36 preferably are made from steel sheet, aluminum or a suitable composite in which circular flanges, with central openings therein and spoke holes therein are punched out. For a particular wheel all of these punch outs are identical, the difference between flanges on each side of the hub assembly being defined by their fit (e.g., ninety degree offset) with the respective end sections 12 of the hub body. The inside edges of the spoke holes are chamfered. Each flange is bent around its circumference as previously described. Each flange is cleaned and rust inhibited as is conventional. An important aspect of this flange manufacture step is the ease of changing the process between flanges with different numbers of spoke holes using conventional punches.

The retaining members, as shown in FIGS. 1 and 5, are usually threaded nuts 88 and washers 92 as previously described, although other conventional devices could be used. All elements are cleaned and rust inhibited and some are threaded.

The assembly steps for the embodiment of FIGS. 1 and 5 includes several sub-steps as follows:

1. A flange 36 is fitted onto each end 12 of hub body 4. Each flange 36 is in contact with the end of central section 8 and interlocks with the respective end section 12 of hub body 4.
2. Preferably, for this embodiment, the flanges are secured to sections 12 and held by washers 92. As an alternative, heat and pressure directed parallel to axis 16 and toward center plane 28 can be applied to help secure each flange to the hub body.
3. One of the retaining devices is attached to one end of axle 80.
4. Lubricant, such as a Teflon liquid lubricant, is applied to the entire length of axle 80 to aid in assembly.
5. Axle 80 is inserted through shaft opening 32 so that its opposite end extends beyond the shaft opening on the other end thereof. This insertion is a rotational action so that the raised parts (which results from roll threading) of the threads on that end of the axle, being of a harder substance, such as steel, than the plastic hub body at 32b, will remove interfering portions of the hub body at 32b and create a sliding and lubricated fit for the un-threaded central portion of the axle 80 in shaft opening 32. Molding the opening 32 in the hub body 4 larger at 32a ensures this insertion because the axle could not be threaded all the way through opening 32 if it had the smaller diameter 32b all the way through.
6. After the axle is inserted through the shaft opening 32, another retaining member 88 is assembled onto the exposed opposite end of the axle.

The complete axle assembly may then be distributed as a separate unit or may be attached by spokes inserted through the spoke holes to an entire wheel assembly. Finally, when the wheel is assembled on a bicycle frame the fork straddles the hub at the retaining members (e.g., to the left of 152 and right of 156 in FIG. 10) and lock nuts and suitable conventional fork retaining devices are added on each end (e.g., 84) of the axle.

The method for manufacture and assembly of the embodiment of FIG. 10 differs to some extent. Here the hub body 4 and the bushings 128 are all formed by conventional injection molding. The bushings 128 preferably are of Acetal 80 as described above. Since in step No. 5 below it will not be necessary to remove interfering portions of the hub body in this FIG. 10 embodiment, a wider range of and/or less expensive materials may be used such as acetyl, polypropylene and nylon for the hub body. The axle 140 is formed with the enlarged portion 152 through a heading or forging process. Formation of the flanges for all embodiments is similar.

The assembly steps for the embodiment of FIG. 10 is as follows:

1. A flange is fitted onto each end of hub body 4 abutting abutment portion 116 and interlocking with mating portion 120.
2. The axle 140 is formed in a conventional heading process, and roll threaded in a second operation. The OD of the threads is substantially the same as the ID of the bushings 128.
3. Bushings 128 are inserted through central openings 40 on each flange 36 and into hollow core space 124 and 112 of central section 8 with bushing abutments 136 against each flange 36.
4. Lubricant can be applied to each un-threaded end portion of axle 140.
5. Axle 140 is inserted through the central openings so that enlarged portion 152 abuts the flange 136 of one bushing 128 (on the left in FIG. 10).
6. Nut 156 is screwed on the opposite threaded end of the axle 140 to secure the axle to the hub.

These components all fit together easily, thereby facilitating assembly.

While embodiments of the present invention have been shown and described, various modifications may be made without departing from the scope of the present invention, and all such modifications and equivalents are intended to be covered.

What is claimed is:

1. A wheel hub assembly comprising:
   a. an injection molded hub body having end sections with like shapes angularly offset about an axis extending between the end sections, and having a central opening therethrough between the ends thereof;
   b. an axle extending through said central opening in rotational relationship about said axis with said hub body, said axle having two ends extending beyond said ends of said central opening;
   c. like flanges having openings mating with the respective ends of said hub body, each of said flanges including holes for mounting of a plurality of wheel spokes;
   d. wherein said end sections of said hub body include radially extending protrusions and said flanges include recesses which mate with one another to engage in a locking fit therebetween; and
   e. wherein said end sections have two diametrically opposite protrusions which are larger than other protrusions and are angularly offset about said axis from one another.

2. A wheel hub assembly according to claim 1 wherein said diametrically opposite protrusions of said end sections are each aligned with one of said spoke holes.

3. A wheel hub assembly according to claim 1 further including a bushing in each end of the hub body partly within said central opening, each of said bushings including an abutment portion engaging said flanges.

4. A wheel hub assembly according to claim 3 wherein said axle engages said bushings and does not engage said hub body.

5. A wheel hub assembly according to claim 4 wherein said axle includes an enlarged portion engaging one of said bushings.

6. A wheel hub assembly, comprising:
   a. an injection molded hub body having two end sections with like shapes angularly offset about an axis extending between the end sections, and having a central opening extending therethrough between said end sections;
   b. identical flanges having openings therein keyed and attached to the respective end sections of said hub body;
   c. an axle extending through said central opening in rotational relationship about said axis with said hub body, said axle having two ends extending beyond said end sections of said central opening; and
   d. bushings inserted into respective ends of said central opening, each bushing including an abutment portion engaging the respective flange on said respective end section.

7. The wheel hub assembly of claim 6 wherein said bushings directly rotationally engage said axle about said axis, thereby providing a sliding fit between said axle and said bushings.

8. The ball bearing-free wheel hub assembly of claim 6 wherein said bushings comprise injection molded plastic having a low coefficient of friction.

9. A wheel hub assembly with five different parts comprising:
   a. an injection molded hub body having end sections with like shapes angularly offset about an axis extending between the end sections, and having a central opening extending therethrough between said end sections;
   b. two like flanges having openings contacting and communicating with the respective end sections of said hub body, each flange including a plurality of holes for mounting wheel spokes;
   c. two like bushings inserted into respective ends of said central opening, each bushing including an abutment portion engaging the respective flange on said respective end section;
   d. an axle extending through said central opening in rotational relationship about said axis with said hub body, said axle having two ends extending beyond said end sections of said central opening; and
   e. a retaining member on one of said ends of said axle.

10. The wheel hub assembly of claim 9 wherein said end sections are angularly offset from one another about said axis.

11. The wheel hub assembly of claim 9 wherein said bushings comprise injection molded plastic having a low coefficient of friction, and wherein said bushings directly rotationally engage said axle about said axis.

12. A seven piece wheel hub assembly with only five different parts consisting of:
   a. an injection molded hub body having end sections with angularly offset like shapes angularly offset about an axis extending between the end sections and having a central opening extending therethrough between said end sections;
   b. two identical flanges having openings contacting and communicating with the respective end sections of said hub body, each flange including a plurality of holes for mounting wheel spokes;
   c. two like bushings inserted into respective ends of said central opening, each bushing including an abutment portion engaging the respective flange on said respective end section;
   d. an axle extending through said central opening in rotational relationship about said axis with said hub body, said axle having two ends extending beyond said end sections of said central opening, one of said ends including an integral enlarged portion; and
   e. a retaining member on the other of said ends of said axle, said integral enlarged portion and said retaining member engaging the respective bushings on opposite ends of said axle, thereby maintaining said axle from moving axially.

13. The seven piece wheel hub assembly of claim 12 wherein said bushings comprise injection molded plastic having a low coefficient of friction, and wherein said bushings directly rotationally engage said axle about said axis.

* * * * *

UNITED STATES PATENT AND TRADEMARK OFFICE
CERTIFICATE OF CORRECTION

PATENT NO. : 5,829,844
DATED : November 3, 1998
INVENTOR(S) : Billy D. Slankard, et al.

It is certified that error appears in the above-indentified patent and that said Letters Patent is hereby corrected as shown below:

Column 2 line 55, change "32b" to -- 32a --.

Column 4, line 12, change "each" to -- end --.

Column 4, line 30, after the word "example", delete -- ) --.

Column 4, line 36, change "+" to -- ÷ --.

Column 4, line 38, change "+" to -- ÷ --.

Signed and Sealed this

Twenty-third Day of November, 1999

Attest:

Q. TODD DICKINSON

*Attesting Officer*    *Acting Commissioner of Patents and Trademarks*

UNITED STATES PATENT AND TRADEMARK OFFICE
CERTIFICATE OF CORRECTION

PATENT NO. : 5,829,844
DATED : November 3, 1998
INVENTOR(S) : Billy D. Slankard, et al.

It is certified that error appears in the above-identified patent and that said Letters Patent is hereby corrected as shown below:

Column 1, line 51, change "as" to -- are --.

Signed and Sealed this

Twenty-first Day of December, 1999

Attest:

Q. TODD DICKINSON

*Attesting Officer*  *Acting Commissioner of Patents and Trademarks*